March 25, 1952 — R. BURDETT — 2,590,149
SPICE CAN HOLDER
Filed May 24, 1948
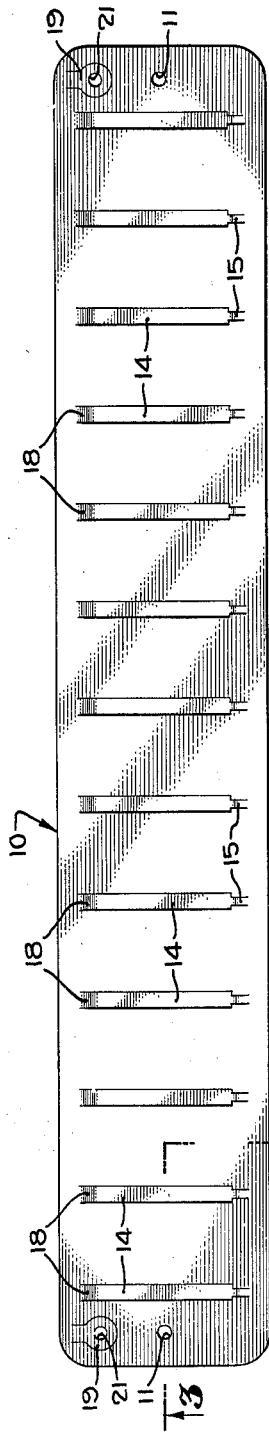
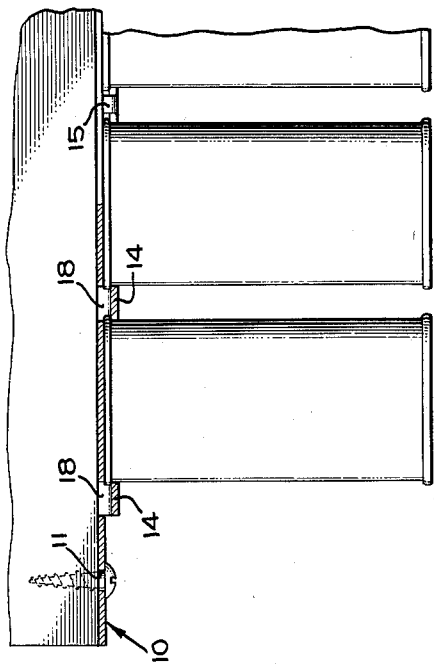
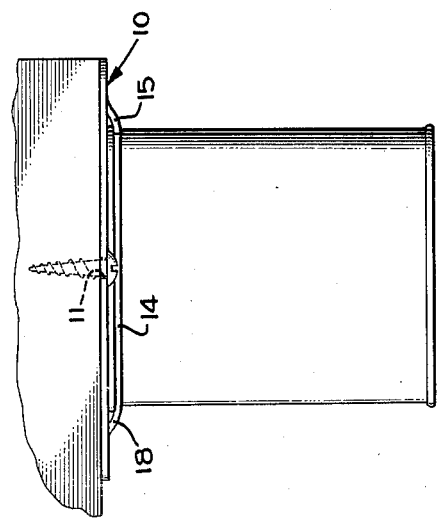
INVENTOR,
Roy Burdett
BY
Hazard & Miller
ATTORNEYS Patented Mar. 25, 1952

2,590,149

UNITED STATES PATENT OFFICE 2,590,149

SPICE CAN HOLDER

Roy Burdett, Long Beach, Calif.

Application May 24, 1948, Serial No. 28,876

3 Claims. (Cl. 211—73)

This invention relates to a holder or rack and particularly to a holder or rack adapted to receive containers having beads therearound and still more particularly to a rack or holder so constructed or formed as to receive spice cans or the like.

A main object of this invention is to provide a holder or rack for spice cans or the like which holder or rack is extremely simple in construction and can be inexpensively manufactured from a single plate or sheet of metal or the like.

Another object of this invention is to provide a holder or rack for spice cans or the like which can be made from a single sheet of metal or the like by merely performing a stamping operation on the metal. Still another object of this invention is to provide a method for making a rack or holder as above described.

Another object of this invention is to provide a holder or rack for spice cans or the like which rack or holder is so constructed that it may be applied to the under side of a horizontal surface or to a vertical surface whichever is desired.

Another object of this invention is to provide a rack or holder for spice cans or the like which is so formed that there are no protruding members so that the rack or holder is safer to use than prior racks or holders having protruding members.

With the foregoing and other objects in view, which will be made manifest in the following detailed description and specifically pointed out in the appended claims, reference is had to the accompanying drawings for an illustrative embodiment of the invention, wherein:

Fig. 1 discloses a plan view of the rack or holder embodying the present invention;

Fig. 2 is an end elevation view of Fig. 1; and

Fig. 3 is a sectional view along lines 3—3 of Fig. 1.

Referring to the accompanying drawings wherein similar reference characters designate similar parts throughout, the invention will be shown and described as adapted to receive spice cans or the like but this embodiment is not intended to limit the invention since it is obvious that any can, bottle, container, etc. which has a beaded or protruding portion therearound can be held in the rack or holder. The holder or rack of the present invention as embodied in Figs. 1 and 2 of the drawings comprises a flat substantially rectangular sheet or plate of metal or like material 10 which has holes 11 provided adjacent the ends thereof, as shown in Fig. 1, to adapt the holder or rack to be fastened to the under side of a horizontal surface, though, of course, the rack could be applied to any surface by use of the holes 11. The sheet or plate 10 is scored, as shown in Fig. 1, the scoring being reduced near the forward end of plate 10 for purposes to be described. The portions of the plate between the sets of scoring marks are struck out from the plate in any suitable manner to the position shown in Fig. 2 and it will be seen that the forward ends of each struck out portion 14 has a narrowed portion 15 at the forward end thereof. The spaces between the struck out portions 14 are preferably formed to allow the body of a spice can to be passed therebetween. The upper bead on the spice can protrudes out farther than the body of the can and this bead enters through the opening provided by opposed narrowed portions 15 of the struck out portions 14. The rear portions 18 of the struck out portions 14 provide stops against which the spice can will rest.

Although the spaces between the struck out portions of Fig. 1 are shown to be approximately the same, it is contemplated that a rack or holder may be provided having a majority of one type of spaces and a minority of another type of spaces, the latter named spaces being somewhat larger than the first type. It is common knowledge that ordinary spice cans come in about three sizes of which two sizes are usually used by the housewife, a small size and a large size, the small size being predominately used. So, it is contemplated that a rack or holder would be provided with a majority of small sizes and a single or perhaps two or more large spaces to accept the larger cans.

It is also contemplated that racks or holders will be provided with different numbers of total spaces for receiving cans, that is, from, say, 4 to 16 can receiving racks or holders so that a person may buy any combination of racks or holders to achieve a desired number of can receiving spaces, whereby one rack or holder can be applied next to another rack or holder to provide the desired number of receiving slots for receiving the cans.

It is preferred that tabs 19 be scored out on sheet 10 and these tabs are provided with holes 21 therein. These tabs are preferably left in the plate and they may be struck out somewhat perpendicular to the plate to enable the rack or holder to be applied to a vertical surface with the main plane of the rack remaining in a horizontal plane.

It will be appreciated that by the above construction a very simple rack or holder is provided which can be inexpensively manufactured quickly and easily and since the struck out portions 14 are anchored at both ends of the plate 10 there will be no bending or damaging of the parts of the rack or holder by hurried insertion of the spice cans. Since there are no protruding members on the rack or holder, there is no danger of injury to the hands of the person inserting the spice cans in the rack.

Although the preferred form of the invention is a plate having struck out portions the rack or holder can be formed with strips, the main bodies of which are spaced from the plate and the ends of which are anchored to the plate by any suitable means.

Various changes may be made in the details of construction without departing from the spirit and scope of the invention as defined by the appended claims.

I claim:

1. A holder for containers having a bead thereon comprising a substantially flat plate having a plurality of struck out portions anchored at both ends and narrowed at their forward ends to permit the beaded portions of the containers to pass through the edges of the struck-out portions.

2. A holder for spice cans and the like comprising a substantially flat rectangular plate having a plurality of strip-like bridging members anchored at both ends of the plate and narrowed at their forward ends to provide entering openings for the beads on the spice cans.

3. A device of the class described adapted to contain a plurality of spice cans and similar containers beaded around the upper portions thereof comprising a flat rectangular sheet metal base member, there being a plurality of parallel bridging container supporting elements arranged down the length of the base member and having both ends secured to the base member and the main body portions thereof spaced from the plane of the base member a distance slightly greater than the thickness of the beads on the containers, the bridging elements being spaced apart a distance less than the distance across the beaded portions of the containers, the forward portions of the bridging elements being reduced to allow the beaded portions of the containers to pass between and then above the margins of the bridging elements and be supported by the bridging elements.

ROY BURDETT.

REFERENCES CITED

The following references are of record in the file of this patent:

UNITED STATES PATENTS

| Number | Name | Date |
|---|---|---|
| 278,161 | McKee | May 22, 1883 |
| 777,823 | Webster et al. | Dec. 20, 1904 |
| 1,226,192 | Davis et al. | May 15, 1917 |
| 1,456,728 | Frank | May 29, 1923 |
| 1,474,113 | Harris | Nov. 13, 1923 |
| 1,720,328 | Henderson | July 9, 1929 |
| 1,925,540 | Neuschotz | Sept. 5, 1933 |
| 1,939,642 | Barnes | Dec. 19, 1933 |
| 2,043,070 | Rutkowski | June 2, 1936 |

FOREIGN PATENTS

| Number | Country | Date |
|---|---|---|
| 612,067 | Great Britain | Nov. 8, 1948 |